Sept. 8, 1970          L. C. CASTERLINE ET AL          3,527,482
                          HYDRAULIC COUPLING
Filed July 30, 1968                                 4 Sheets-Sheet 1
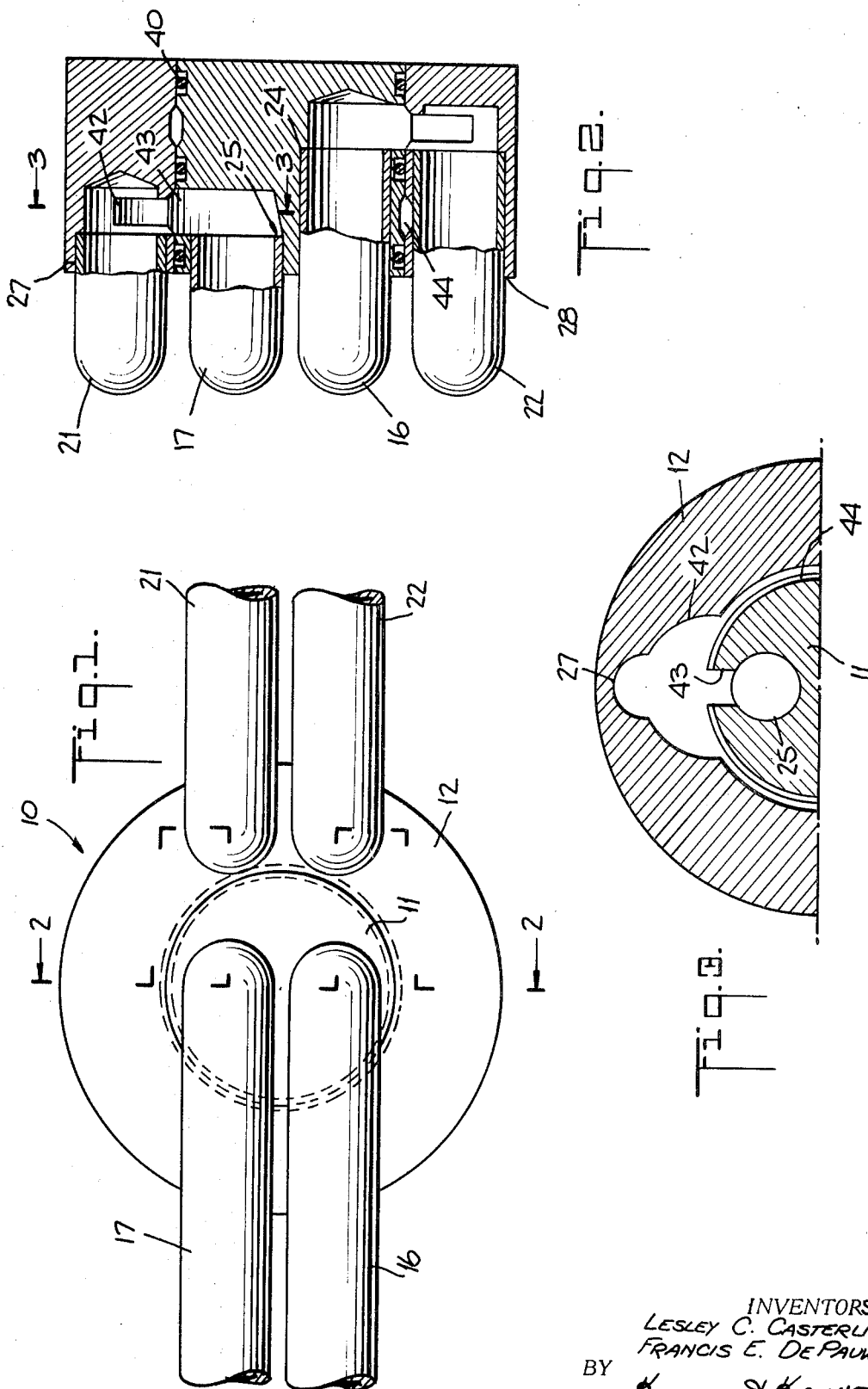
INVENTORS
LESLEY C. CASTERLINE
FRANCIS E. DE PAUW
BY
Kenyon & Kenyon
ATTORNEYS

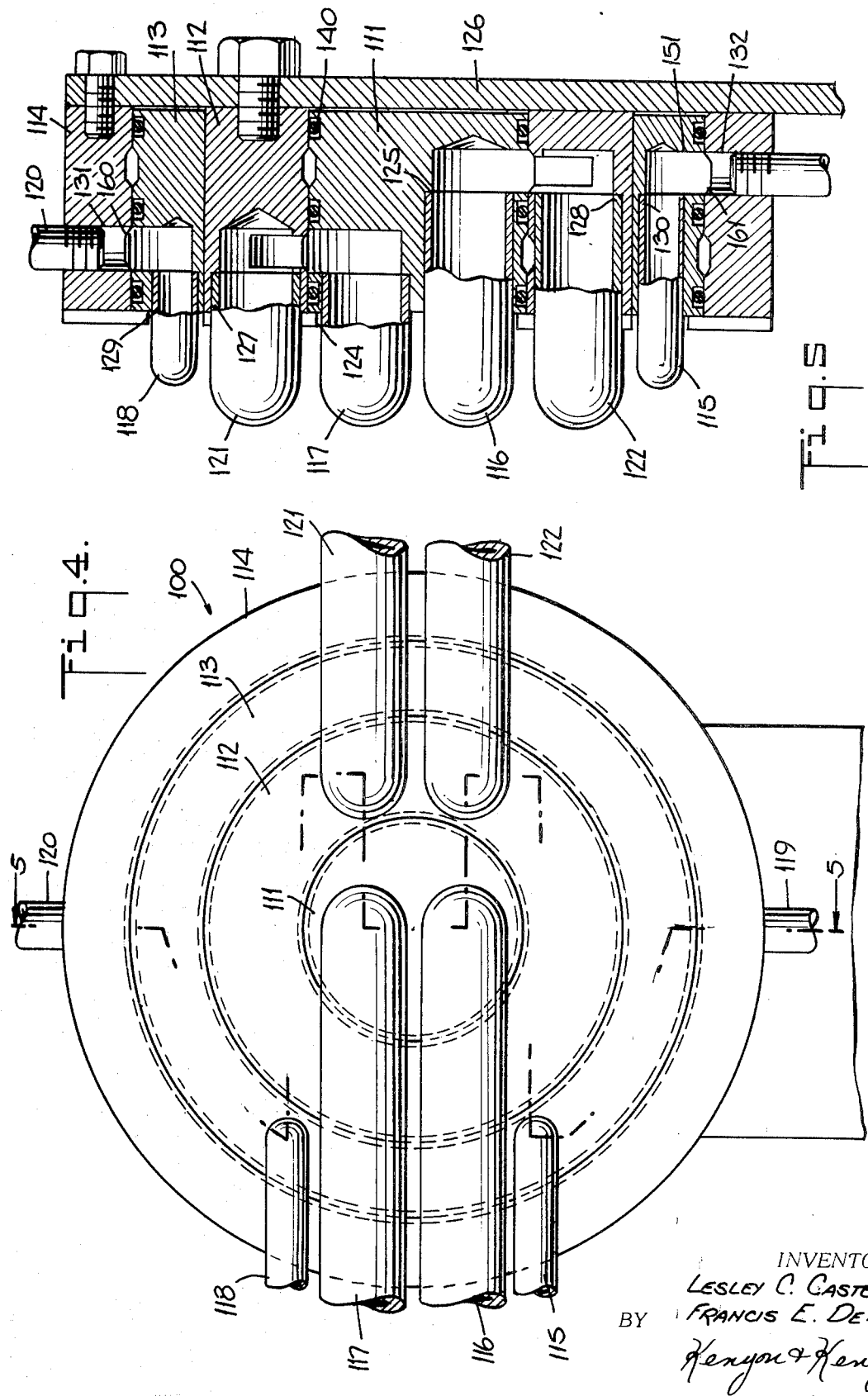

Sept. 8, 1970     L. C. CASTERLINE ET AL     3,527,482
HYDRAULIC COUPLING
Filed July 30, 1968     4 Sheets-Sheet 4
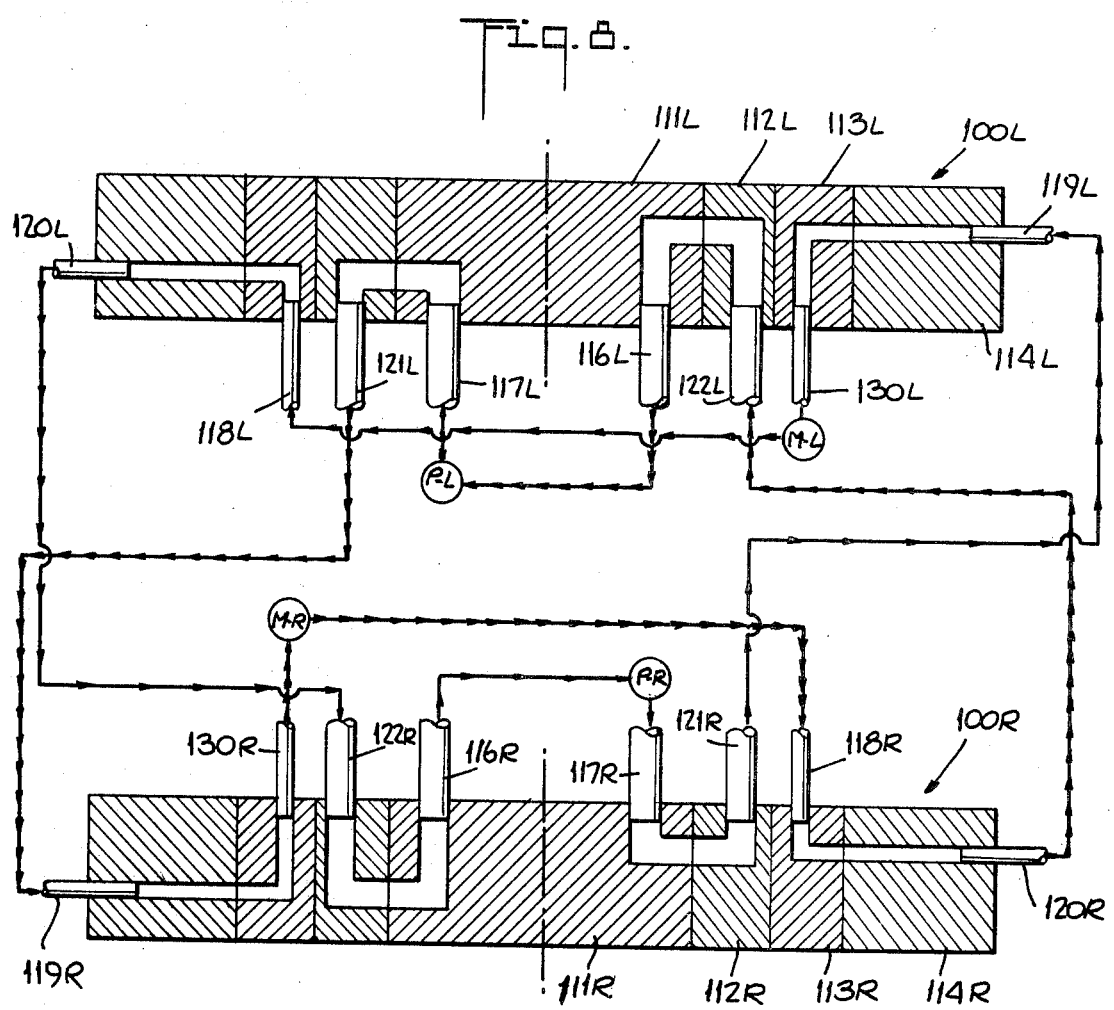
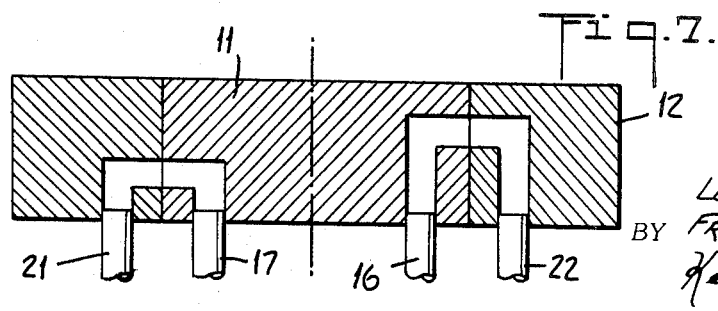
INVENTOR.
LESLEY C. CASTERLINE
FRANCIS E. DePAUW
BY Kenyon & Kenyon
ATTORNEYS

United States Patent Office 3,527,482
Patented Sept. 8, 1970

3,527,482
HYDRAULIC COUPLING
Lesley C. Casterline, Hurst, and Francis E. De Pauw,
Fort Worth, Tex., assignors to Bell Aerospace Corporation, Wheatfield, N.Y., a corporation of Delaware
Filed July 30, 1968, Ser. No. 748,705
Int. Cl. F16l 39/00
U.S. Cl. 285—136                                          7 Claims

ABSTRACT OF THE DISCLOSURE

A hydraulic coupling is disclosed for hydraulically linking hydraulic systems on two adjacent bodies that rotate relative to each other along a surface of revolution. The coupling includes a port in a first one of the bodies and a cutaway portion in the second body, the port and the cutaway portion being in communication with one another at the surface of revolution. The cutaway portion on the second body is larger than and spans the port on the first body to maintain communication between the port and cutaway as the bodies rotate relative to each other. A fluid conduit communicates with the port in the first body and a separate conduit communicates with the cutaway portion of the second body member. The adjacent paired concentric members may each be fixed to separate relatively movable bodies with the conduits on each concentric member fixed to the hydraulic systems on the relatively movable bodies to hydraulically link these systems.

SPECIFICATION

This invention relates to hydraulic couplings and more specifically to hydraulic couplings that can hydraulically link hydraulic systems on two bodies that rotate relative to each other.

BACKGROUND OF THE INVENTION

It has long been known to employ various devices to allow a hydraulic system on one body to be coupled to a hydraulic system on a second body even though the bodies rotate relative to one another. Where the amount of rotation between the bodies is sufficiently limited, flexible lines can be and have been used to hydraulically link the two bodies. Similarly, extension tubes have been used to hydraulically link hydraulic systems on bodies that rotate relative to each other where the amount of rotation between the two bodies is relatively small. Hydraulic swivels have also been used with limited success to allow a hydraulic system on one body to be communicated to a hydraulic system on a second body where the bodies rotate relative to each other.

Prior art devices, as just described, have various limitations in operation. The flexible tubes function effectively for a very limited amount of rotation of the two bodies relative to each other as do the extension tubes, the latter also being very heavy and requiring considerable space. Additionally, neither the prior art flexible tubes, the extension tubes or hydraulic swivels were sufficiently rigid in construction to effectively function when used in an environment that is subjected to rigorous vibrations, such as in a helicopter. A further drawback of these prior art devices was that as a unitary compact device, they could not be used to transfer fluid from a hydraulic system on one body to a hydraulic system on a second body and simultaneously return the fluid to the hydraulic system on the first body, where the bodies rotated relative to each other. Nor could these prior art devices communicate dual hydraulic systems such as are found on helicopters on parts of the helicopter that rotate relative to each other.

While hydraulic couplings are used in many different environments they are specifically required in aircraft, such as helicopters, to hydraulically link hydraulic systems on one part of the aircraft with hydraulic systems on a second part of the aircraft, where the second part of the aircraft rotates relative to the first part. This is particularly true in stubby wing helicopters which include a relatively large pod rotatably mounted on a fixed wing, the wing being considered fixed as it does not move relative to the helicopter fuselage while the pod rotates on the wing. Normally the pod includes the hydraulic system pump and some of the hydraulic motor elements necessary to controls used during flight. Other hydraulic controls are located in the wing and in the fuselage. Because the wing and the pod rotate relative to each other a coupling is necessary to hydraulically link the pump and portion of the hydraulic system in the pod with the rest of the hydraulic system in the wing and fuselage. Many helicopters have dual hydraulic systems with a separate pump located on each helicopter pod. The two systems operate in parallel and provide a safety feature in that failure of one system leaves the other available to provide half authority. In these dual hydraulic systems the pump on each pod pumps fluid through the wing on which it is mounted, across the fuselage, through the other wing to the other pod where it performs work. The fluid is then returned from the pod where it has performed work through the wing on which said pod is mounted, across the fuselage of the helicopter through the wing which supports the pod where the fluid originally came from to the pod mounted thereon. A dual hydraulic system as just disclosed has the advantage that if one hydraulic system fails only half authority is lost.

The prior art hydraulic couplings mentioned above were not suitable for use in helicopters. Some of the prior art couplings were not suitable for use in helicopters because of the large volume of space they occupied and their great weight. Obviously, aboard a helicopter, weight and space are at a premium. Similarly, all the previously discussed prior art hydraulic couplings could function only if the relatively rotatable bodies they were transferring fluid between had a limited relative rotation significantly less than the amount of rotation desired between the helicopter pod and the wing on which it is mounted. Additionally, the prior art hydraulic couplings were not rigid in construction and could not withstand vigorous vibrations which are inherent in the operation of helicopters.

It is therefore a broad object of the present invention to provide an improved coupling that can hydraulically link hydraulic systems on two bodies that rotate relative to each other.

It is a more specific object of the present invention to provide such a coupling that is relatively light in weight and simple of construction.

Yet another object of the invention is to provide such a coupling small enough and light enough in weight so as to be suitable for use in an aircraft, such as a helicopter.

A still further object of the invention is to provide such a coupling that is sufficiently rigid in construction to effectively function even if subjected to shock, vibration and/or jolt.

Another object of the invention is to provide a coupling meeting the above objectives which has sufficient fluid transferring capacity to be suitable for use in an aircraft, such as a helicopter.

SUMMARY OF THE INVENTION

Briefly, in accordance with the present invention, the foregoing and other objects are accomplished with paired adjacent members that are capable of rotating relative to each other along a surface of rotation. Fluid communication between the paired adjacent members is provided through at least one port in a first of the members which extends to the surface of rotation and mating cutaway portions on the adjacent paired member for each port on the first member. Each cutaway portion is larger than and spans its mated port on the first member and thus is in continual communication therewith as the members rotate relative to each other. Thus, conduits which communicate with the ports on the first member and conduits which communicate with the cutaway portions on the paired second member will be in communication with each other as the members rotate relative to each other.

BRIEF DESCRIPTION OF THE DRAWINGS

Other objects, aspects and features of the present invention will be apparent from the following description and drawings in which:

FIG. 1 is a plan view of an embodiment of the present invention;

FIG. 2 is a view along line 2—2 of FIG. 1;

FIG. 3 is a view along line 3—3 of FIG. 2;

FIG. 4 is a plan view of a second embodiment of the present invention;

FIG. 5 is a view along lines 5—5 of FIG. 4;

FIG. 7 is a schematic illustration of how fluid may be transferred in the embodiment of FIGS. 1–3; and FIG. 8 is a schematic illustration of how the embodiment of FIGS. 4–6 may be used in a dual hydraulic system.

DESCRIPTION OF THE PREFERRED EMBODIMENTS

FIGS. 1–3 embodiment

Figure 6:
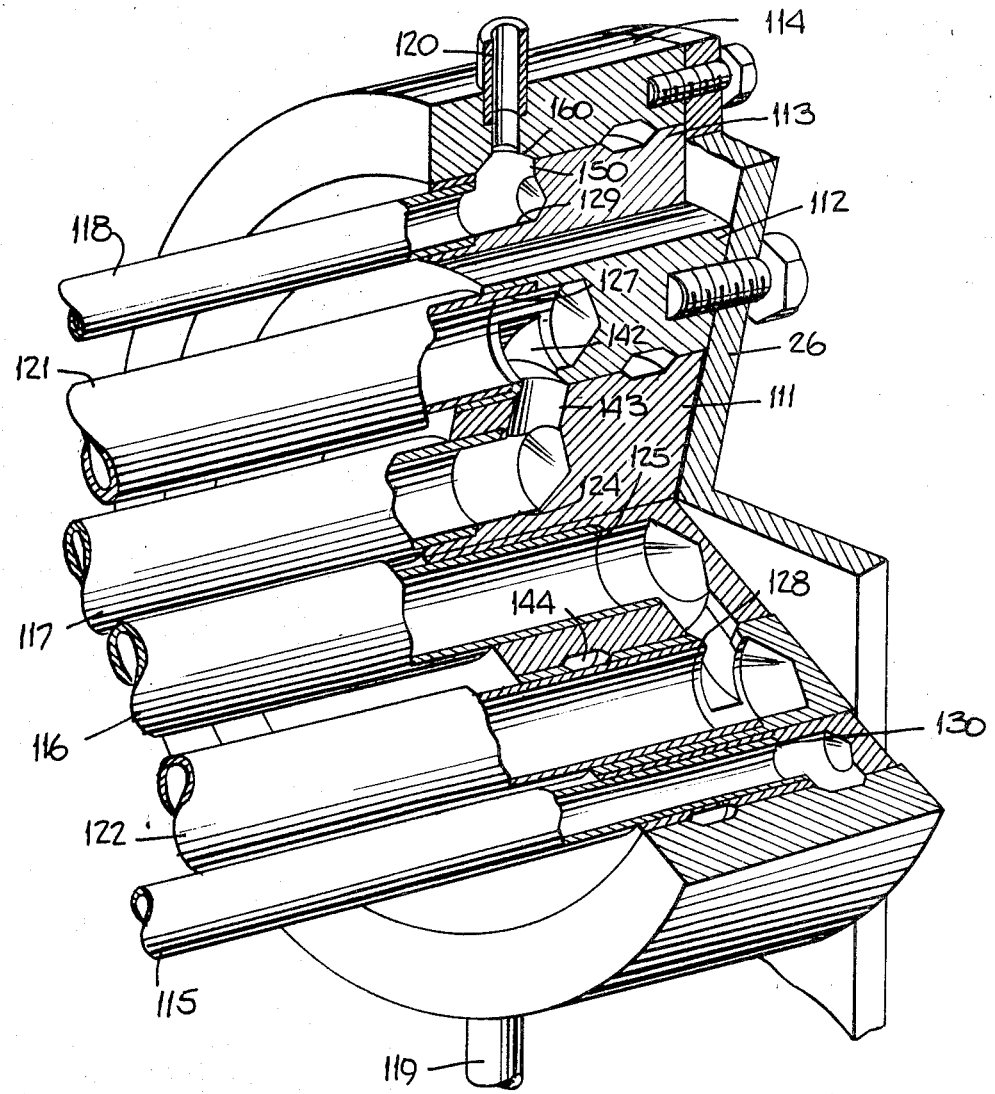
FIG. 6 is an isometric cutaway view of FIGS. 4 and 5.

Referring now to the drawings, and more particularly to FIGS. 1–3, a hydraulic coupling 10 includes an inner cylindrical member 11 which is symmetrical about the axis of a line passing through its center. Hollow cylindrical member 12 concentrically and co-axially surrounds member 11 about an interface surface between the members and is capable of moving relative to member 11.

As can be seen from FIGS. 1 and 2, conduits 16 and 17 extended parallel to the uppermost surface of hydraulic coupling 10 and bend just above member 11 to extend perpendicularly into member 11. Similarly, conduits 21 and 22 extend perpendicularly into member 12, as viewed in FIGS. 1 and 2, and pass parallel over the top of hydraulic coupling 10 in opposite directions from which conduits 16 and 17 extend from the inner member 11. As can be seen from FIGS. 2 and 3, member 11 is a cylindrical member having ports 24 and 25 in communication with conduits 16 and 17, respectively. The ports 24, 25 extend to the interface or surface of rotation between inner member 11 and outer member 12. Outer member 12 includes ports 27 and 28 which communicate with conduits 21 and 22, respectively. The ports 27 and 28 communicate with undercut areas 42 and 42a, respectively. Appropriate O-rings 40 are located between members 11 and 12 to provide fluid seals.

To aid in preventing fluid which is being transferred between conduit 17 and conduit 21 from leaking to conduit 16, conduit 17 and conduit 16 extend to different depths in coupling 10. If conduits 17 and 16 extended to a common depth in coupling 10, fluid in conduit 17 might leak through port 25 to port 24 and to conduit 16, since the distance between the respective conduits and ports would be small and not present high resistance to flow therebetween. By having conduits 17 and 16 extend to different depths in coupling 10, the distance between the ends of the respective conduits and the parts of the ports which receive the ends of the conduits, and which represent the location where leakage would most likely occur, is maximized, increasing the resistance to flow therebetween and decreasing the danger of leakage between conduit 17 and port 25 and conduit 16 and port 24.

The manner of transferring fluid between conduits 17 and 21 is similar to the manner of transferring fluid between conduits 16 and 22. Thus an understanding of the transfer of fluid between conduits 17 and 21, as seen in FIGS. 2 and 3, will provide an understanding of the transfer of fluid between conduits 16 and 22.

As can best be seen in FIG. 3, port 25 communicates with a radial port 43 located in member 11, port 43 extending to the outer surface of inner member 11. Outer member 12 includes a cutaway portion 42 which communicates with port 27 and spans a portion of the circumference of member 11 greater than the diameter of the port 43 to provide communication between the port 43 and the cutaway area 42. Port 25 communicates with conduit 17 while port 27 communicates with conduit 21. An annular constriction 44 is located between members 11 and 12 and surrounds member 11 for the circumference of member 11 that is not overlapped by cutaway portion 42 to provide a balanced pressure environment between the two members 11 and 12.

When fluid is to be transferred from conduit 17 to conduit 21 the fluid will pass through port 25 to radial port 43 and cutaway portion 42 to port 27 and conduit 21. Part of the fluid will enter the annular construction 44 and, with the fluid in cutaway area 42, will completely surround the inner member 11 thereby hydrostatically balancing the member 11.

When member 11 and member 12 rotate relative to each other, from the position seen in FIG. 3, cutaway area 42 will still span radial port 43 maintaining fluid communication between radial port 43 and cutaway area 42. Cutaway area 42 will span radial port 43 in the embodiment shown over an arc of about ninety degrees (90°).

If it is desired to use the hydraulic coupling of FIGS. 1–3 to transfer fluid between two hydraulic systems fixed on bodies that rotate relative to each other, one of the members is fixed to one body and the member's two conduits are comunicated to the hydraulic system on that body. Similarly, the other member is fixed to the other body with its two conduits communicated to the hydraulic system on the other body. Thus with member 11 fixed to one body and conduits 17 and 16 connected to the hydraulic system located there, member 12 will be fixed to the other relatively rotatable body with conduits 22 and 21 fixed to the hydraulic system thereon. Fluid may be transferred, as schematically shown in FIG. 7, from conduit 17 (and thus from the hydraulic system in the body to which member 11 is fixed) to conduit 21 (and thus to the hydraulic system in the body to which member 12 is fixed) so as to perform work there. Fluid from member 12 is then returned to the source on the member 11 via conduit 22 in member 12 and conduit 16 in member 11. Of course, if desired, the fluid could flow through the system in an opposite direction to that just described.

Dual hydraulic system embodiment (FIGS. 4–6)

FIGS. 4–6 represent a modification of the embodiment of FIGS. 1–3 for use in a dual hydraulic system. To facilitate comparison between the couplings of FIGS. 1–3 and FIGS. 4–6, comparable reference numerals for identical parts in the two embodiments are used with 100 added to the numbers in FIGS. 4–6. Thus, member 11 in FIGS. 1–3 corresponds to member 111 of FIGS. 4–6, etc.

In coupling 100 of FIGS. 4–6 cylindrical member 113 is concentric about member 112 and cylindrical member 114 is concentric about member 113. With an interface surface between members 113 and 114. Members 111 and 113 are, when coupling 100 is used in a helicopter, fixed to the pod which rotates relative to the helicopter fuselage. Thus these members are for convenience herein called rotors. Similarly, as members 112 and 114 are fixed to each other by bracket 126 and fixed to the helicopter wing when the coupling is used in a helicopter, the helicopter wing being fixed relative to the helicopter fuselage, these members are deemed herein stators. This nomenclature is for ease in identifying the parts of the present invention only and obviously the rotor could be considered stationary and the stator considered the rotatable member.

Conduits 115 and 118 extend parallel to conduits 116 and 117 and make a right angle turn into rotor 113. Conduits 119 and 120 extend from opposite sides of stator 114 beneath the upper surface of the coupling, as may best be seen in FIGS. 5 and 6. Rotor 113 includes ports 129 and 130 which receive conduits 118 and 115, respectively, while stator 114 includes ports 131 and 132 which receive conduits 120 and 119, respectively. The manner of transferring fluid between conduits 118 and 120 and conduits 115 and 119 is similar to the manner of transferring fluid between conduit 17 and conduit 21 in the FIG. 1 embodiment, except that conduits 115 and 119 and conduits 118 and 120 are perpendicular to each other while conduits 17 and 21 are parallel to each other. Thus, rotor 113 includes radial portions 150 and 151 which communicate with ports 129 and 130 and conduits 118 and 115, respectively. Similarly, stator 114 includes cutaway portions 160, 161 which communicate with conduits 120 and 119, respectively, and which span radial ports 150 and 151, respectively. For a further understanding of the manner of transferring fluid between conduits 118 and 120 and conduits 115 and 119, respectively, reference is made to the part of the specification wherein the manner of transferring fluid between conduit 17 and conduit 21 is discussed. Conduits 115, 119, 118 and 120 have lower fluid carrying capacity than conduits 116, 117, 121, and 122 for the reason explained below. While this particular embodiment of the present invention is suitable for use in any dual hydraulic system it is particularly suited for use in a dual helicopter hydraulic system.

Operation of FIGS. 4-6 embodiment

While the embodiment of FIGS. 4-6 can be used in any dual hydraulic system, it is specifically suited for dual hydraulic systems as are used in a stubby wing helicopter where it will be necessary to use two of the couplings shown in FIGS. 4-6. Each coupling will be fixed between a helicopter wing and its respective pod with the members previously delineated as the rotor being fixed to the helicopter pod while the members previously delineated as the stator being fixed to the helicopter wing. The stators of each hydraulic coupling are hydraulically linked across the helicopter fuselage. This is schematically illustrated in FIG. 8 where coupling 100L (identical to the coupling of FIGS. 4-6) is located between the left helicopter wing and pod and coupling 100R, similar to coupling 100L, is located between the right helicopter wing and pod. Coupling 100L has the letter L after the numerical designation of each of its parts while coupling 100R has the letter R after the numerical designation of each of its parts to avoid confusion between the identical couplings and their parts. Conduits 121L and 119R, 120L and 122R, 122L and 120R and 119L and 121R are all connected to each other across the helicopter fuselage.

In a dual helicopter hydraulic system, a pump and hydraulic control elements are located on each helicopter pod and further control elements are located in the wing and fuselage. Thus, pump P-R, which is mounted on the right pod, is schematically shown in communication with conduit 117R which is fixed relative to the right pod while pump P-L, which is mounted on the left helicopter pod, is shown in communication with conduit 117L which is fixed relative to the left helicopter pod. The hydraulic motor on the left pod is designated M-L and is shown connected to conduits 118L and 130L which are fixed relative to the right pod. Conduits 116L and 117L, 116R and 117R are joined to each other as is schematically illustrated in FIG. 8. The fluid pumped from pump P-L flows on the path shown by the closely spaced arrow heads leading from the pump while the fluid pumped from pump P-R flows in the path shown by the more widely spaced apart arrow heads leading from pump P-R. Since the flow from each pump follows symmetrical paths in the respective couplings, a discussion of the flow from pump P-L will be sufficient for an understanding of how the coupling of the embodiment of FIGS. 4-6 may be used in a dual helicopter hydraulic system. Fluid from pump P-L flows to conduit 117L which is fixed relative to the left helicopter pod through coupling 100L to conduit 121L, the latter conduit being fixed to stator 112 which is fixed relative to the left helicopter wing. The controls on the left helicopter wing divide the flow from conduit 121L to operate hydraulic devices within the helicopter fuselage and one the right pod.

Since only part of the fluid from conduit 121L is to be transferred to the right helicopter pod, the rest being used to operate hydraulic devices within the wings and fuselage conduit 119R, is smaller in diameter and has a lower fluid carrying capacity than does conduit 121L. Fluid from conduit 119R, which is fixed relative to the right helicopter wing, is transferred through coupling 100R to conduit 130R and to the right helicopter pod and motor M-R thereon, where the fluid performs useful work. Conduits 130R, 118R and 120R and conduits 118L, 119L, 120L and 130L are of lower fluid carrying capacity than conduits 116L, 117L, 121L, 122L, 116R, 117R, 121R and 122R for the same reason that conduit 119R has a lower fluid carrying capacity than conduit 121L. After the fluid has performed useful work on motor M-R it is transferred by conduit 118R, which is fixed relative to the right helicopter pod, and coupling 100R to conduit 120R on the right helicopter wing. Conduit 120R transfers the fluid across the fuselage of the helicopter to conduit 122L on the left helicopter wing. The fluid that was directed from conduit 121L to perform work on the hydraulic motors in the helicopter fuselage is returned to the right wing at this point requiring the large flow capacity of conduit 122L. Coupling 100L allows the fluid to be transferred from the left helicopter wing and conduit 122L to conduit 116L and the left helicopter pod to be transferred to the sump that is associated with pump P-L. A symmetrical flow occurs from the fluid pumped from pump P-L.

This system provides for control of the helicopter even if one of the hydraulic systems should fail since the second hydraulic system, which is independent from the first hydraulic system, will still continue to operate. By using the coupling of the present invention in this system, reliable fluid transfer between the relatively movable helicopter wings and pods is obtained without adding unduly to the weight of the helicopter.

While the use of the coupling of FIGS. 4-6 has been specifically disclosed in a dual helicopter hydraulic system, it is obvious that it could be used in other environments where dual hydraulic systems are used.

Having thus described the invention it is not intended that it be so limited as changes may be readily made therein without departing from the scope of the invention. Accordingly, it is intended that the subject matter described above and shown in the drawings be interpreted as illustrative and not in a limiting sense.

What is claimed is:
1. A hydraulic coupling comprising:
(a) a first member having first and second ports,
(b) a second member surrounding said first member and having third and fourth ports,
(c) a third member surrounding said second member and having a fifth port,
(d) a fourth member surrounding said third member and having a sixth port,
(e) said first and third members fixed relative to each other and said second and fourth members fixed relative to each other with said second and fourth members rotatable relative to said first and third members, with means to hold said second, third and fourth members concentric with said first member,
(f) said first and second members being adjacent one another along a first interface surface between said members,
(g) said first, second, third and fourth ports in communication with said first interface surface,
(h) first means located in a first plane along said first interface surface for communicating only said first and third ports when said first and second members rotate relative to each other and when said first and second members are fixed relative to each other,
(i) second means located in a second plane which is spaced apart from said first plane along said first interface surface for communicating only second and fourth ports when said first and second members are rotated relative to each other and when said first and second members are fixed relative to each other,
(j) a second interface surface between said third and fourth members, said fifth port of said third member and said sixth port of said fourth member in communication with said second interface surface,
(k) third means along said second interface surface for communicating only said fifth port of said third member with said sixth port of said fourth member when said third and fourth members are rotated relative to each other and when said third and fourth members are fixed relative to each other.

2. A coupling according to claim 1 wherein fourth means are located along said first interface surface in said first plane in communication with said first port of said first member for balancing hydrostatic forces on said first member as fluid is transferred between said first and third ports.

3. A coupling according to claim 1 wherein said first means is defined by:
said second member including a cutaway area at said first interface surface, said cutaway area having a dimension spanning the dimensions of said first port in the direction of rotation of said first and second members relative to one another to maintain communication between said cutaway area and said first port over an area of rotation subtended by the span of said cutaway area and said third port being in communication with said cutaway area.

4. A coupling according to claim 3 wherein said first and second means are similar to each other.

5. A coupling according to claim 3 wherein said first, second and third means are similar to each other.

6. A coupling according to claim 3 wherein:
(a) an annular constriction is located about a part of said first member at said first interface surface between first member and said second member and is in communication with said cutaway portion on said second member,
(b) said annular constriction and said cutaway portion on said second member surrounding a portion of said first member to hydrostatically balance pressure forces thereabout from fluid being transferred between said first and third ports.

7. A coupling according to claim 6 wherein means are provided for balancing hydrostatic forces about said third member as fluid is transferred between said fifth and sixth ports.

References Cited

UNITED STATES PATENTS

| | | | |
|---|---|---|---|
| 2,781,134 | 2/1957 | Weir et al. | 285—136 X |
| 2,873,810 | 2/1959 | Orton | 285—190 X |
| 3,240,279 | 3/1966 | Dorkins | 285—137 X |

FOREIGN PATENTS 759,098  10/1956  Great Britain.

THOMAS F. CALLAGHAN, Primary Examiner

U.S. Cl. X.R.

137—580; 285—137